US008607624B2

(12) United States Patent
Renninger et al.

(10) Patent No.: US 8,607,624 B2
(45) Date of Patent: Dec. 17, 2013

(54) SENSOR SYSTEM FOR DETERMINING A PARAMETER OF A FLUID MEDIUM

(75) Inventors: Erhard Renninger, Markgroeningen (DE); Achim Briese, Rutesheim (DE); Hans Hecht, Stuttgart (DE); Ulrich Wagner, Stuttgart (DE); Uwe Konzelmann, Asperg (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 13/119,100

(22) PCT Filed: Aug. 13, 2009

(86) PCT No.: PCT/EP2009/060482
§ 371 (c)(1),
(2), (4) Date: May 24, 2011

(87) PCT Pub. No.: WO2010/031644
PCT Pub. Date: Mar. 25, 2010

(65) Prior Publication Data
US 2012/0048005 A1  Mar. 1, 2012

(30) Foreign Application Priority Data
Sep. 17, 2008  (DE) .......................... 10 2008 042 155

(51) Int. Cl.
*G01M 15/04*  (2006.01)
(52) U.S. Cl.
USPC ..................................................... 73/114.32
(58) Field of Classification Search
USPC ............... 73/114.31, 114.32, 114.33, 114.34, 73/114.35, 114.37
See application file for complete search history.

(56) References Cited

U.S. PATENT DOCUMENTS

| | | | | |
|---|---|---|---|---|
| 7,162,920 | B2 * | 1/2007 | Konzelmann et al. | 73/202.5 |
| 7,305,877 | B2 * | 12/2007 | Beyrich et al. | 73/202.5 |
| 7,360,414 | B2 * | 4/2008 | Konzelmann et al. | 73/202.5 |
| 7,980,125 | B2 * | 7/2011 | Renninger et al. | 73/204.11 |
| 2006/0021429 | A1 * | 2/2006 | Konzelmann et al. | 73/202.5 |
| 2006/0156829 | A1 * | 7/2006 | Konzelmann et al. | 73/861.27 |
| 2007/0062275 | A1 * | 3/2007 | Beyrich et al. | 73/204.21 |
| 2010/0300187 | A1 * | 12/2010 | Renninger et al. | 73/114.42 |
| 2011/0179858 | A1 * | 7/2011 | Mais et al. | 73/114.32 |

FOREIGN PATENT DOCUMENTS

| | | |
|---|---|---|
| DE | 27 51 159 | 5/1979 |
| DE | 102 53 970 | 6/2004 |
| DE | 103 45 584 | 4/2005 |
| DE | 10 2004 060063 | 6/2006 |
| EP | 0 720 723 | 7/1996 |
| EP | 1 065 475 | 1/2001 |
| EP | 1 065 476 | 1/2001 |
| JP | 54-79069 | 6/1979 |
| JP | 9-236465 | 9/1997 |
| JP | 2001-12987 | 1/2001 |
| JP | 2002-174540 | 6/2002 |
| JP | 2004-505235 | 2/2004 |
| JP | 2006-522917 | 10/2006 |

* cited by examiner

*Primary Examiner* — Eric S McCall
(74) *Attorney, Agent, or Firm* — Kenyon & Kenyon LLP

(57) ABSTRACT

A sensor system for determining at least one parameter of a fluid medium flowing through a channel, in particular of an intake air mass of an internal combustion engine. The sensor system has at least one sensor chip situated in the channel for determining the parameter of the fluid medium. The sensor chip is accommodated in a sensor carrier that extends into the channel. The sensor carrier has an inflow edge situated transversely to the flow of the fluid medium, which on its part has at least one turbolator, which is equipped to develop turbulences in the flowing fluid medium in the area of the sensor carrier.

12 Claims, 4 Drawing Sheets

--Prior Art--

--Prior Art--

SENSOR SYSTEM FOR DETERMINING A PARAMETER OF A FLUID MEDIUM

FIELD OF THE INVENTION

The present invention relates to sensor systems for determining at least one parameter of a fluid medium flowing in a line.

BACKGROUND INFORMATION

Sensor systems for determining at least one parameter of a fluid medium flowing in a line are used, for example, for measuring intake air masses of an internal combustion engine. In particular, such devices may be used in the form of hot-film air-mass flow meters. Other types of devices for determining other, or additional parameters are also conceivable, however, for instance, temperature sensors, speedometers or similar measuring devices, as well as other measuring principles than the hot-film air-mass flow meter principle.

Hot-film air-mass flow meters are discussed in DE 102 53 970 A1, for example. In that text, a device is described which includes a part that is able to be installed, at a predetermined alignment, with respect to a main flow direction, in a line that has the flowing medium flowing through it. A partial flow of the medium, in this context, flows through at least one measuring channel provided in the part, in which a measuring element is situated. Between the inlet and the measuring element, the measuring channel has a curved section for diverting the partial flow of the medium that has entered the measuring channel through the inlet, the curved section going over, during the further course, into a section in which the measuring element is situated. In the measuring channel, in this instance, an arrangement is provided that guides the flow and that counteracts the detachment of the partial medium flow from the channel walls of the measuring channel. Furthermore, the inlet region in the area of the opening, that points counter to the main flow direction, is provided with slantwise or curved areas that are designed in such a way that medium flowing into the inlet area is steered away from the part of the measuring channel that leads to the measuring element. This has the effect that liquid portions or solid parts contained in the medium, based on their inertia, are not able to get to the measuring element and to pollute it.

Devices, such as the one in DE 102 53 970 A1, have to satisfy a plurality of requirements and boundary conditions in practice. These boundary conditions are extensively known from the literature, and discussed, for example, in DE 102 53 970 A1. In addition to the aim of reducing a pressure drop at the devices, altogether by suitable flow technology design, one of the main challenges is further to improve the signal quality of such devices. This signal quality refers particularly to the signal level swing, which is determined, for instance, by the rate of flow of the medium through the measuring channel leading to the sensor element, and refers perhaps to the reduction in signal drift and the improvement in the signal-to-noise ratio. The embodiment of the inlet opening discussed, for example, in DE 102 53 970 A1, by an area repelling fluid particles and dust particles is used particularly for the purpose mentioned—the reduction in the signal drift.

In usual sensor systems of the type described, as a rule, a sensor carrier having a sensor chip mounted on it or in it extends into the measuring channel. The sensor chip may, for instance, be adhered into the sensor carrier or adhered onto it. The sensor carrier may, for example, form one unit with a bottom plate made of metal, onto which an electronic system, a control and evaluation circuit in the form of a circuit board, may also be adhered. The sensor carrier may be designed, for instance, as an extruded-on plastic part of an electronic module. The sensor chip and the control and evaluation circuit may be connected to each other by bonding connections, for example. The electronic module thus created may, for instance, be adhered into the sensor housing, and the entire plug-in sensor may be closed using covers. One example of such a system is discussed in DE 103 45 584 A1 or in EP 0 720 723 B1.

It has been shown, in this context, that the contour of the inflow (leading) edge of the sensor carrier, which extends into the measuring channel, has decisive importance for the signal quality of the sensor system. Thus, it is proposed, for example, in DE 103 45 584 A1, that one should design the inflow edge of the sensor carrier to be rounded off, in order to improve the flow quality at the sensor carrier and at the sensor chip, and to avoid pulsating, nonstationary detachments. In EP 0 720 723 B1 it is analogously proposed that one should design the inflow edge to be rounded off or perhaps to be wedge-shaped, to avoid areas of turbulence (eddies) or areas of detachment on the surface of the sensor chip.

This contouring of the inflow edge of the sensor carrier, using a profile that is rounded off in section, is, however, comparatively costly to implement technically. Thus, the system discussed in DE 103 45 584 A1, for example, requires, as a rule, injection molding the sensor carrier onto the sheet metal component of the bottom plate of the electronic module, which is comparatively costly, from a constructive point of view. It would therefore be desirable to produce the circuit board of the electronic module and the bottom plate as well as the sensor carrier in one piece, and replaced by a single circuit board. In this case, however, a contouring using an inflow edge that is rounded off, as is described in the related art, would be technically only very costly to implement, since using the circuit board limits the choice of the cross section of the sensor carrier, as a rule.

SUMMARY OF THE INVENTION

Therefore, a sensor system is provided, for determining at least one parameter of a fluid medium that is flowing through a channel, which supplies a sufficient flow quality at the sensor chip without inducing a pulsating, non-stationary detachment, even when a circuit board is used as sensor carrier, instead of a sensor carrier that is costly to form. The sensor system may be used again, for instance, for determining an air mass rate of flow, of an intake air mass of an internal combustion engine, for example. Alternatively or in addition, however, other parameters of the fluid medium, for instance, other physical and/or chemical parameters, such as pressure, temperature or similar parameters of the flowing fluid medium may also be measured. On this matter, reference may be made, for example, to the related art cited above.

The sensor system has at least one sensor chip, situated in the channel through which the flowing fluid medium flows, for determining the parameter of the fluid medium. The sensor chip may be produced, for instance, in known semiconductor technology, for example, as a silicon sensor chip, and may have a sensor surface over which the fluid medium is able to flow. This sensor surface may have, for instance, one or more sensor elements for determining the parameter, for instance, one or more heating resistor elements, one or more temperature sensors, or the like.

The channel may be, for instance, a measuring channel plug-in sensor of the sensor system, which is plugged into the flowing fluid medium. Accordingly, the channel may have flowing through it a quantity of the fluid medium per time unit that is representative of the flow of the fluid medium, as is known from known hot-film air-mass flow meter sensor systems.

The sensor chip is accommodated in a sensor carrier that extends into the channel. By being accommodated, one may understand, in this instance, an accommodation, for example, on a surface of the sensor carrier and/or an accommodation in a recess of the sensor carrier, as is known from the related art, the accommodation being able to take place in such a way, for example, that the sensor surface of the sensor chip is able to have the flowing fluid medium flowing over it. Any structure comes into consideration as the sensor carrier which supplies the required mechanical stability for holding the sensor chip essentially at a fixed location within the channel. This sensor carrier may be designed as a flat, disk-shaped element having any cross section, so that the flat side of this sensor carrier points counter to the flow, and offers a comparatively low flow resistance.

The sensor carrier has an inflow edge that is situated transversely to the flow of the fluid medium, as is true also in the related art. By "transversely to the flow" one should understand a system in which the inflow edge includes an angle with the local main flow direction of the fluid medium through the channel, at the location of the sensor carrier, which is different from 0°. As is pointed out in greater detail below, this angle does not necessarily have to amount to 90°, but inflow angles between 0° and 90° may be provided, for example, between 30° and 80°.

One aspect of the exemplary embodiments and/or exemplary methods of the present invention is that, instead of a technically costly contouring of the inflow edge, in a sectional plane perpendicular to the longitudinal extension of the sensor carrier, which (as described, for instance, in EP 0 720 723 B1) is supposed to avoid turbulence formations and detachment areas, such detachments areas may also be extensively avoided by a deliberate production of longitudinal turbulence. This longitudinal turbulence ensures stabilization of the flow. It is accordingly provided that the inflow edge should be furnished with at least one turbulator. This turbulator should be equipped to develop turbulence, especially longitudinal turbulence, in the flowing fluid medium in the vicinity of the sensor carrier, that is, in the flow direction, behind the inflow edge.

This turbulence, in particular the longitudinal turbulence, gives rise to an improved, thorough mixing of rapid fluid, that is distant from the wall, and slower fluid close to the wall that is in danger of detaching, in the area of the sensor carrier. This thorough mixing promotes the avoidance of detachment. These required longitudinal turbulences are produced by the turbulator at the inflow edge of the sensor carrier. Detachment at the sensor carrier is avoided thereby, especially at the lower side of the sensor carrier that is opposite to the sensor surface of the sensor chip. This reduces the fluctuation in the flow in the area of the sensor carrier, which brings about reduced signal noise and better reproducibility of the signal.

In contrast to the comparatively technically costly profiling of the inflow edge, in a sectional plane perpendicular to the longitudinal extension of the sensor carrier, like the one of a design discussed, for instance, in DE 103 45 584 A1 or in EP 0 720 723 B1, the proposed turbulator at the inflow edge is comparatively easy to produce, and is also suitable for constructions in which (see below) the sensor carrier is replaced totally or partially by a circuit board. The turbulator is particularly able to be replaced by contouring the inflow edge along its longitudinal extension direction. Thus, the inflow edge in its longitudinal extension direction, that is, along this inflow edge, may have one or more of the following contours, which may also be used repetitively or in combination: A wave profile, a zigzag profile, a triangular profile, particularly a triangular profile having a plurality of triangles lined up against one another in the longitudinal extension direction, a profile having at least one recess, especially a round recess, especially a profile having a plurality of round recesses lined up against one another in the longitudinal extension direction. Examples of such contours will be explained in more detail below.

These contourings are able to be developed particularly completely in a plane parallel to the plane of extension of the sensor carrier. These planar contourings may therefore be produced, by contrast to the profilings in a sectional plane perpendicular to this longitudinal extension plane of the sensor carrier, technically, for example, by simple sawing, cutting, laser cutting, milling, eroding, etching or the like, without costly production processes being required for this.

The longitudinal turbulences may be developed on one side or on both sides of the sensor carrier, for instance, as a function of the curve of the contraction, i.e. the narrowing in the measuring channel. In particular, the longitudinal turbulences may be situated below the sensor carrier. Alternatively or in addition, however, systems are also conceivable in which these longitudinal turbulences run above the sensor element.

Instead of the contours mentioned, other forms of the inflow edge are also possible, as long as these are equipped to produce the eddies required for the thorough mixing, especially longitudinal turbulences. The contour itself is a function, for instance, of the production method used. For example, as described above, one may take into consideration sawing, milling, laser cutting or the like, using, for example, tools such as a milling tool, lasers or similar tools. These contourings may also take place three-dimensionally, i.e. for example, in a dimension parallel to the longitudinal extension of the inflow edge and in a dimension perpendicular to the longitudinal extension plane of the sensor carrier. For this purpose, slantwise milling methods may be used, for example, for instance, at an angle of 30° or 50° to the vertical and perpendicular to the longitudinal extension plane of the sensor carrier. Milling a radius using a profile cutter, a wedge-shaped profile by a deliberate plastic deformation in a stamping process, or the like, may be used to achieve an appropriate contouring while developing a turbulator.

As was described above, within the scope of the exemplary embodiments and/or exemplary methods of the present invention, the sensor carrier may be configured wholly or partially as a circuit board, or is a part of a circuit board. The circuit board may have an extension, for example, which forms the sensor carrier, and which extends into the channel, for instance, the measuring channel. The remaining part of the circuit board may be accommodated, for instance, in an electronics space in a housing of the sensor system or of a plug-in sensor of the sensor system.

Within the scope of the exemplary embodiments and/or exemplary methods of the present invention, one should understand a circuit board generally to mean an essentially plate-shaped element, which may also be used as a carrier of electronic structures, such as printed circuit traces, terminal contacts or the like, and which may also have one or more of such structures. In this context, at least minor deviations from plate shape come into consideration, and should conceptually be included. The circuit board may be produced, for instance, from a plastic material and/or a ceramic material, for instance, an epoxy resin, especially a fiber-reinforced epoxy resin. In particular, the circuit board may be designed as a circuit board having circuit traces, especially printed circuit traces (printed circuit board, PCB).

In this way, as was described above, the electronics module of the sensor system may be greatly simplified, and one may do without a bottom plate and a separate sensor carrier. The bottom plate and the sensor carrier may be replaced by a single circuit board, on which, for instance, a control and evaluation circuit of the sensor system may also totally or partially be situated. This control and evaluation circuit of the sensor system is used for controlling the at least one sensor chip and/or the evaluation of the signals generated by this sensor chip. In this way, by combining the elements mentioned, the production cost of the sensor system may be considerably reduced, and the installation space requirement for the electronics module may be greatly diminished. At the same time, the contouring of the inflow edge using the at least one turbulator avoids the problem described above, namely, that in such combined electronics modules, profiling the inflow edge of the sensor carrier, as known, for example from DE 103 45 584 A1 or from EP 0 720 723 B1 is difficult. Still, using the proposed turbulence formation, one is able to achieve good signal quality, while avoiding interference by pulsating, non-stationary detachments.

The sensor system may particularly have at least one housing, the channel being developed in the housing. The channel may, for instance, include a main channel and a bypass channel or measuring channel, the sensor carrier and the sensor chip being situated, for example, in the measuring channel. Furthermore, the housing may have an electronics space separated from the channel, the electronics module or the circuit board essentially being accommodated in the electronics space. The sensor carrier may then be developed as an extension of the circuit board that extends into the channel. This arrangement is technically comparatively easy to implement, by contrast to the costly electronic modules that are known from the related art.

Moreover, the sensor carrier may be configured, at least partially, as a multilayered sensor carrier, especially in the case in which a circuit board is used as the sensor carrier, but also in other cases and/or while using other media as the sensor carrier. Thus, the sensor carrier may be executed in so-called multilayer technology, and may have two or more carrier layers that are connected to one another. These carrier layers, in turn, may, for example, be produced from a metal, a plastic material or a ceramic material or a composite material, and may be connected to one another using connecting techniques such as adhesion.

In this case, in which a multilayer technology is used with several carrier layers of the sensor carrier, the inflow edge may be executed by a different dimensioning of the carrier layers against the direction of flow of the fluid medium, at least partially step-wise. In this way, the profiles known from the related art may be implemented, for instance, at least approaching one another in a stepped manner. For example, in this way, at least approximately round or wedge-shaped profiled profiles, approaching one another in step form, are able to be developed in a sectional plane, perpendicular to the plane of extension of the sensor carrier.

Furthermore, using this multilayer technology, one is also able to achieve contourings of the inflow edge in its longitudinal extension direction, for instance, one or more of the contourings described above. Thus, in particular, carrier layers along the inflow edge may be contoured at least partially differently with respect to one another, so as to develop at least one turbulator. Adjacent carrier layers, for example, may have a differently contoured inflow side, these inflow sides, in common, forming the inflow edge. In this way, for example, teeth, triangles, recesses or the like may be produced in the inflow edge in order to form the turbulator described.

As was represented above, the inflow edge may be positioned in the channel in such a way that it has flowing at it the flowing medium at an angle that is different from 90°. However, the sensor ship may still be situated on or in the sensor carrier in such a way that the latter is aligned perpendicular to the local main flow direction. The sensor chip may be designed to be rectangular, for instance, one side of this rectangle being situated perpendicular or essentially perpendicular to the local main flow direction, for example, at an alignment that does not deviate by more than 10° from the vertical.

The sensor chip is able to be contacted electrically via at least one electrical connection. The sensor carrier may have, for instance, especially a circuit board forming the sensor carrier, or an extension of this circuit board, one or more printed circuit traces and/or contact pads, which are connected by appropriate contacts on the sensor chip, for instance, by a bonding method. In this case, the electrical connection is able to be protected and separated from the fluid medium by at least one cover. This cover may be designed particularly as a so-called glob top, that is, for example, as a plastic drop and/or an adhesive drop which covers the electrical connection, for instance, the bonding wires. In this way one is also particularly able to minimize influences of the flow by the electrical connection, since the glob top has a smooth surface.

Exemplary embodiments of the present invention are shown in the drawings and explained in greater detail in the following description.

DETAILED DESCRIPTION

Figure 1A:
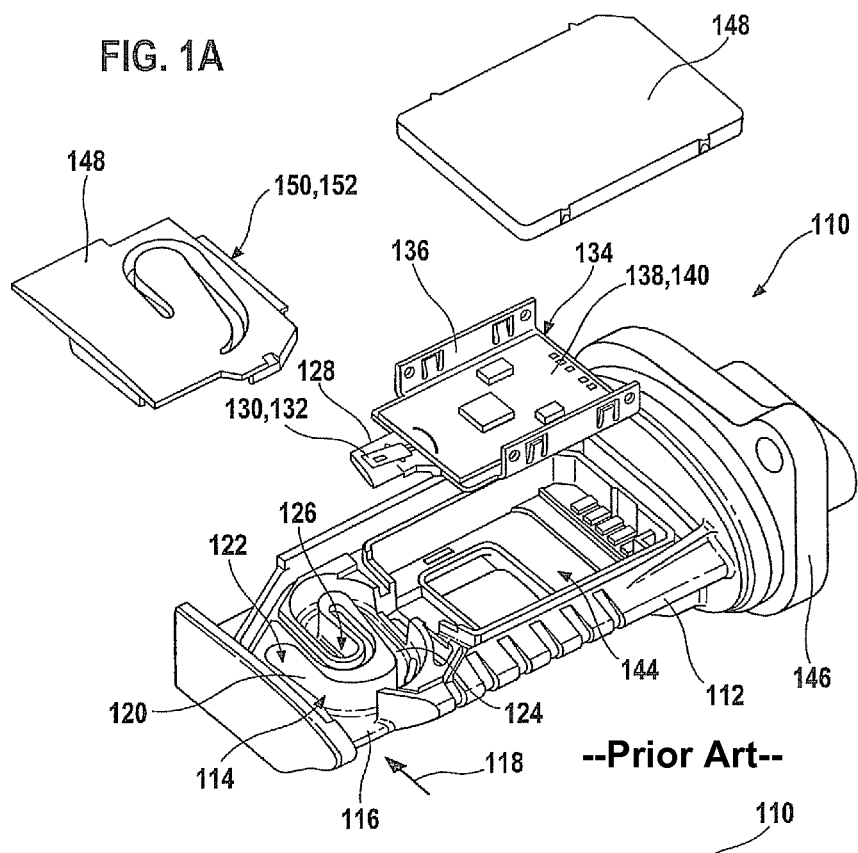
FIG. 1A shows a perspective representation of a known sensor system.
Figure 1B:
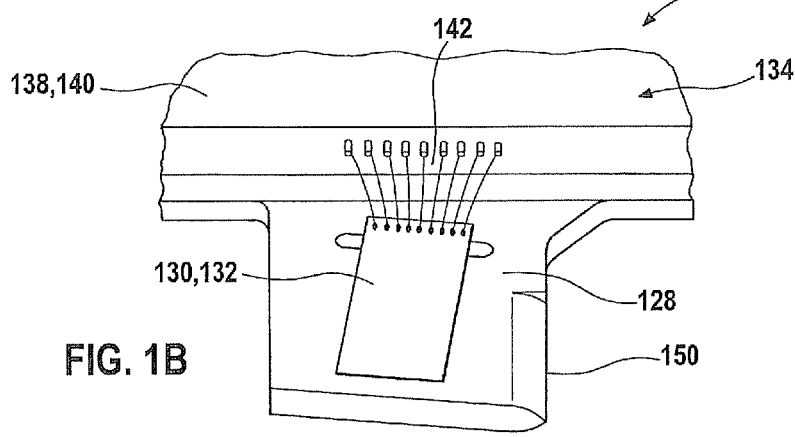
FIG. 1B shows a perspective detailed representation of a sensor carrier of the sensor system according to FIG. 1A.

FIGS. 1A and 1B show a sensor system 110 corresponding to the related art, for determining a parameter of a fluid medium. Sensor system 110 in this exemplary embodiment is designed as a hot-film air-mass flow meter, and includes a plug part 112, which may be plugged, for instance, into a flow pipe, especially an intake manifold of an internal combustion engine. A channel structure 114 is accommodated in the plug part and it is only partially recognizable in FIG. 1A, and it is able to have flowing over it a representative quantity of the fluid medium via an inlet opening 116, which, in the installed state, points facing a main flow direction 118 of fluid medium.

Channel structure 114 has a main channel 120, which opens out on a main flow outlet 122 on the lower side of plug part 112 in FIG. 1A, as well as a measuring channel 124, that branches off from main channel 120, which opens out on a measuring channel 126 that is also situated on the lower side of plug part 112.

A sensor carrier 128, in the form of a lobe extends into measuring channel 124. Into this sensor carrier 128, a sensor chip 130 has been introduced in such a way that a sensor surface 132 has fluid medium flowing over it. As may be seen in FIG. 1A, sensor carrier 128, together with sensor chip 130, is a component of electronic module 134. This electronic module has a bent floor plate 136 as carrier, as well as a circuit board 138 applied onto it, for instance, adhered to it, having a control and evaluation circuit 140. Sensor carrier 128 may, for instance, be extruded as a plastic component onto floor plate 136.

FIG. 1B shows a perspective representation of sensor carrier 128, at a direction of view towards electronic module 134. It may be seen, in this context, that sensor chip 130 is electrically connected to control and evaluation circuit 140 via electrical connections 142, which are designed here as wire bondings.

The electronic module 134 thus created is introduced, adhered, for example, into an electronics space 144 in a housing 146 of plug part 112, in which channel structure 114 is also developed. This takes place in such a way that sensor carrier 128 extends into channel structure 114. Thereafter, electronics space 144 and channel structure 114 are closed by cover 148.

As may be seen particularly in FIG. 1B, sensor carrier 128, which is extruded onto floor plate 136 as an extruded component, for example, is provided with an inflow edge 150, for example, which is designed to be rounded off. This inflow edge 150 may be implemented, for instance, similar to an airplane wing shape at a steady contour. This means, however, that sensor carrier 128 usually has to be produced singly, and therefore cannot usually be processed in multiple numbers in one service.

Figure 2:
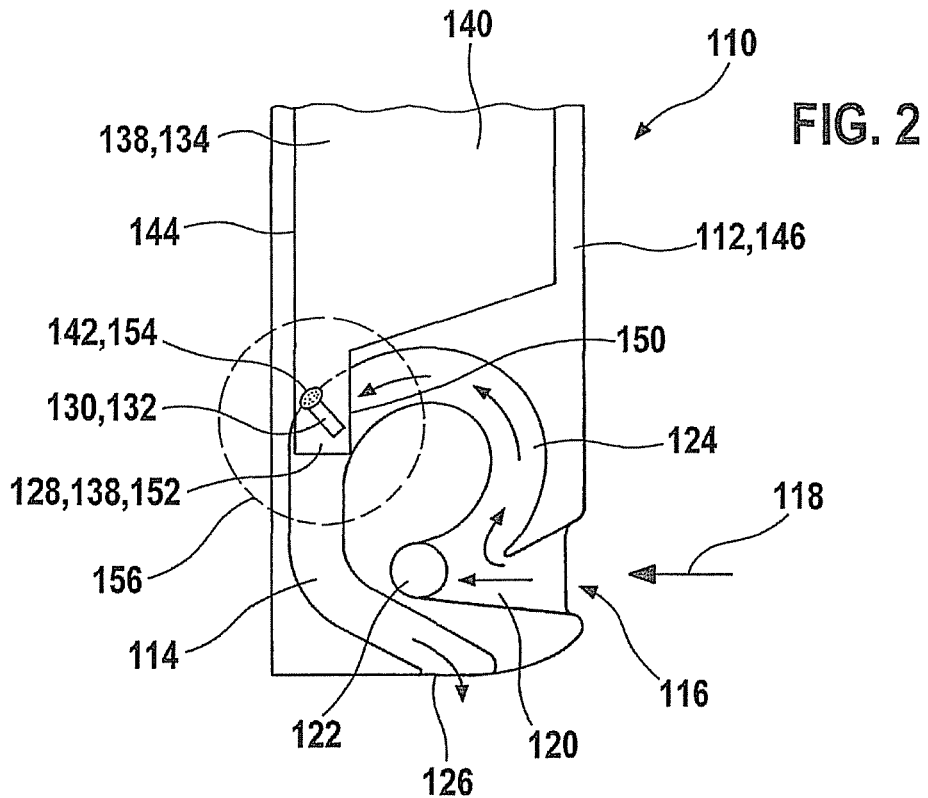
FIG. 2 shows an alternative design to FIGS. 1A and 1B of the sensor system.

This disadvantage becomes particularly noticeable in a further specific embodiment of a sensor system 110, shown in FIG. 2, and which is not yet commercially available at this time. This sensor system in turn also includes a plug part 112, which is designed basically similarly to plug part 112 according to FIG. 1A, so that one may largely refer to the above description. Again, in this plug part 112, a channel structure 114 is accommodated into which a representative quantity of the fluid medium, such as air, is able to flow in via an inlet opening 116. Again, channel structure 114 has a main channel 120, that connects the inlet opening 116 to a main flow outlet 122, from which a measuring channel 124 branches off, which finally opens out on a measuring channel outlet 126. By contrast to the specific embodiment in FIG. 1A, this measuring channel outlet 126 is situated on the lower side of plug part 112. Basically, however, it would be possible to situate it on the back side of plug part 112 in FIG. 2, analogously, for instance, to the representation according to FIG. 1A.

In the specific embodiment according to FIG. 2, sensor system 10 again has an electronic module 134 that is accommodated in an electronics space. By contrast to the specific embodiment according to FIG. 1A, in the specific embodiment according to FIG. 2, bottom plate 136 is supposed to be omitted, however, and replaced completely by circuit board 138. Sensor carrier 128 is designed as extension 152 of this circuit board 138 which, analogously to FIG. 1, extends into measuring channel 124 through an opening in the channel wall of channel structure 114. The positioning of this inward extension is selected to be slightly different from the positioning according to FIG. 1A in this context, which does not, however, represent a basic difference within the scope of the exemplary embodiments and/or exemplary methods of the present invention. This circuit board 138 may, for instance, be designed as a hybrid circuit board, as a PCB (printed circuit board) or as a ceramic circuit board, according to known circuit board technologies. In extension 152 that functions as a sensor carrier 128, a sensor chip 130 having a sensor surface 132 is again accommodated, the accommodation being able to take place on the surface of this extension 152, or again in a recess of this extension 152. Sensor chip 130 is again connected to control and evaluation circuit 140 via electrical connections 142 which, in the specific embodiment shown, may be protected by a cover 154 in the form of a glob top, that is, an adhesive or a plastic drop.

Sensor device 110 according to FIG. 2 thus has the advantage that particularly electronic module 134 is able to be greatly simplified and manufactured expediently. However, in this case the difficulty presents itself that, as shown above, the flow quality at sensor chip 130 and at sensor carrier 128 is of decisive importance for the signal quality of sensor system 110. However, in the case of the use of circuit board 138 also as the sensor carrier 128, profiling of inflow edge 150, for instance, in an airplane wing profile analogously to FIG. 1B, is technically implemented only with great difficulty.

Figure 3:
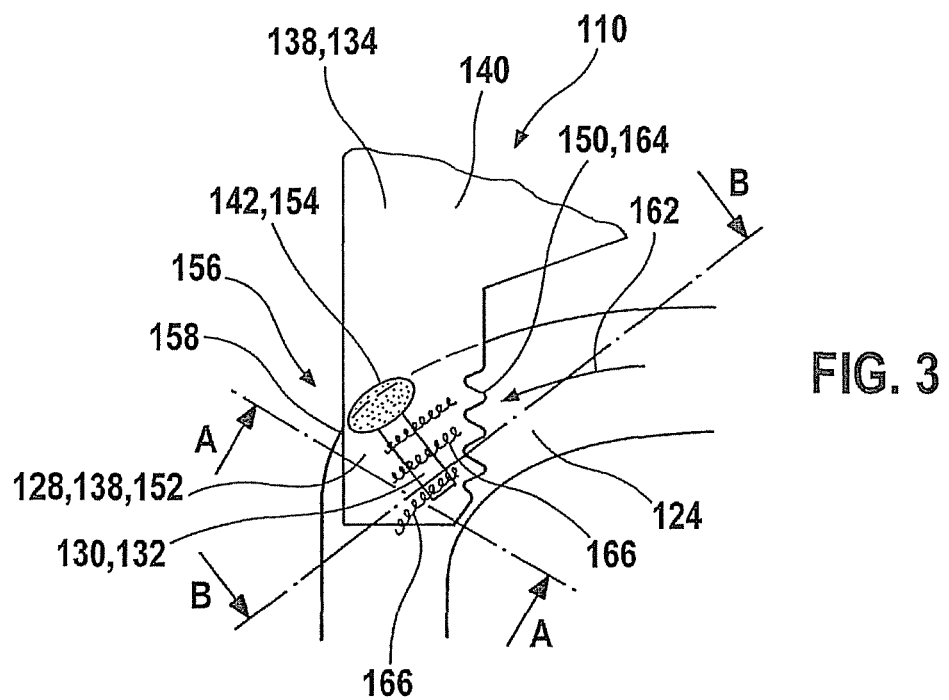
FIG. 3 shows a modification according to the present invention of the sensor system according to FIG. 2.

In order to solve this problem, FIG. 3 therefore shows, in an exemplary modification according to the present invention, a cutout that is encircled in FIG. 2 by a dashed line and is designated by reference numeral 156. For the description of the individual elements one may extensively refer to the description of FIG. 2. Again, extension 152 extends all the way into measuring channel 124, through an opening 158 in a wall 160 of measuring channel 124.

As may be seen in FIG. 3 in the detailed representation, inflow edge 150, which has the fluid medium flowing against it at local flow direction 162, has a contouring. By a contouring, one should understand a contour along the longitudinal extension of this inflow edge 150, in contrast to the profiling in a sectional plane perpendicular to the longitudinal extension plane of sensor carrier 128 known from the related art, that is recognizable in FIG. 1B. However, profiling may additionally be provided optionally. The contouring, which deviates from a straight line of inflow edge 150, includes at least one turbulator 164. This turbulator 164 is executed in the exemplary embodiment shown as wavy, that is, it has a wavy profile in a top view. This generates longitudinal turbulences, which are designated in FIG. 3 by reference numeral 166, and which may lie below or above sensor carrier 128, depending on the curve of the contraction, that is, the flow guidance and the flow narrowing in measuring channel 124.

Figure 4A:
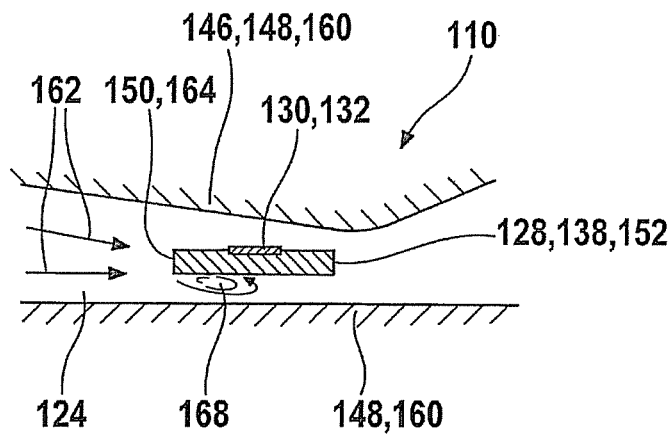
FIG. 4A shows a comparison of a sensor carrier without turbulator in a sectional representation in the sectional plane B-B in FIG. 3.
Figure 4B:
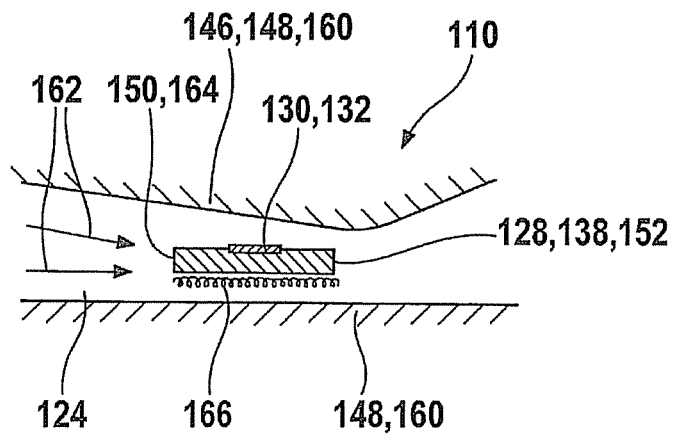
FIG. 4B shows a comparison of a sensor carrier with a turbulator in a sectional representation in the sectional plane B-B in FIG. 3.

This is made clear in FIGS. 4A and 4B, which each represent a sectional representation through sensor system 110 according to FIG. 3, along the cutting line designated by B-B in FIG. 3. In these representations according to FIGS. 4a and 4B, the contraction in measuring channel 124 is also recognizable, which is effected by a corresponding narrowing in cover 148. The flow of the fluid medium is thereby steered and accelerated towards sensor carrier 128.

In this context, FIG. 4A shows the usual case, in which extension 152 of circuit board 138 has no turbulator at its inflow edge 150, and this inflow edge thus shows a straight curve. In this case, detachments form below sensor carrier 128, which are designated in FIG. 4A by reference numeral 168. As was shown above, detachments 168 above sensor carrier 128 are also possible, depending on the contraction in measuring channel 124.

Figure 4C:
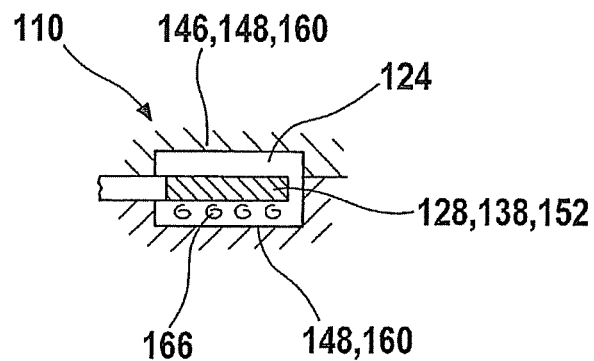
FIG. 4c shows a sectional representation of the sensor system having a turbulator according to FIG. 3, along cutting line A-A.

In FIG. 4, by contrast, the case according to the present invention is shown, in which inflow edge 150 has a contouring having the at least one turbulator, for instance, of the wavy shape shown in FIG. 3. Because of this, longitudinal turbulences 166 form, in the case shown, for example, below sensor carrier 128. These longitudinal turbulences thoroughly mix rapid fluid, removed from the wall of sensor carrier 128 and fluid removed from the wall of measuring channel 160, with slower fluid that is in danger of detaching, at the surface of sensor carrier 128. Because of this, detachments 168 may be effectively avoided, and stabilization of the flow comes about. In FIG. 4C, these longitudinal turbulences are shown once more in a sectional representation along cutting line A-A in FIG. 3.

The advantage of the contouring according to FIG. 3, in which inflow edge 150 of sensor carrier 128 has a turbulator profile impressed on it, as opposed to a profiling according to FIG. 1B, is that the contouring along inflow edge 150 is technically considerably easier to implement, since processing is able to take place, using a comparatively simple tool, perpendicular to the surface of circuit board 138. Thus, the wave pattern, shown in exemplary fashion in FIG. 3, is technically easy to implement by stamping, milling, sawing, etching, laser cutting or the like. The only thing that is decisive is that the contouring produce longitudinal turbulences 166 that are powerful enough.

Figure 5A:
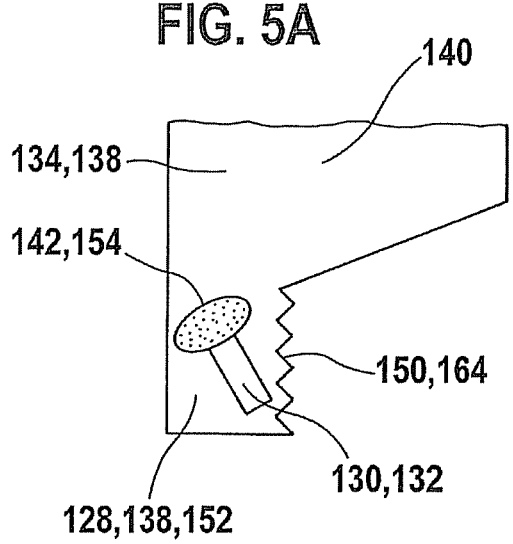
FIG. 5A shows an embodiment alternative to FIG. 3 of the inflow edge of the sensor carrier according to the present invention.
Figure 5B:
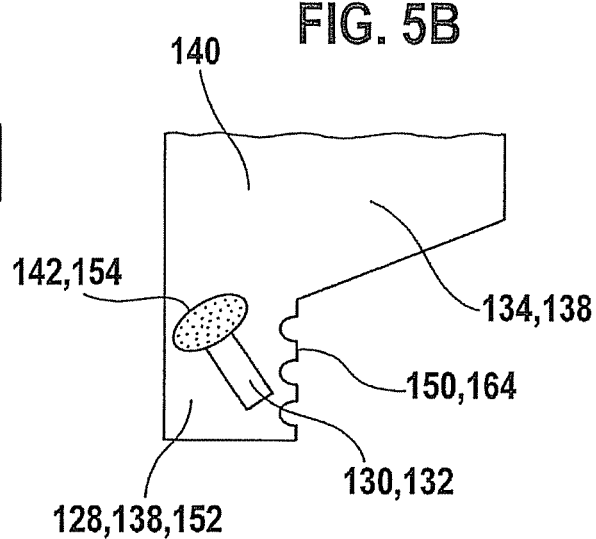
FIG. 5B shows another embodiment alternative to FIG. 3 of the inflow edge of the sensor carrier according to the present invention.

In place of the wave profile shown in FIG. 3 as turbulator 164, FIGS. 5A and 5B show alternative specific embodiments of turbulators, which may also be used, for instance, in sensor system 110 according to FIG. 2. In this instance, FIG. 5A shows an exemplary embodiment in which turbulator 164 has a contoured inflow edge 150 having a zigzag shape or a triangular shape, whereas, in the exemplary embodiment according to FIG. 5B, turbulator 164 includes round recesses in inflow edge 150, which otherwise runs straight. In this context, the contouring of inflow edge 150 is basically also able to take place three-dimensionally, that is, besides or in addition to an embodiment having structures in the drawing plane in FIGS. 3, 5A and 5B having profiling in a direction perpendicular to the plane of the drawing. This three-dimensional contouring of turbulators 164 may be applied, for example, by slantwise milling, for instance, by milling at 30° or 45° to the perpendicular to the drawing plane in FIGS. 3, 5A and 5B, by milling a radius with the aid of a profile cutter, as a wedge-shaped profile by deliberate plastic deformation in a stamping process, or the like.

Figure 6:
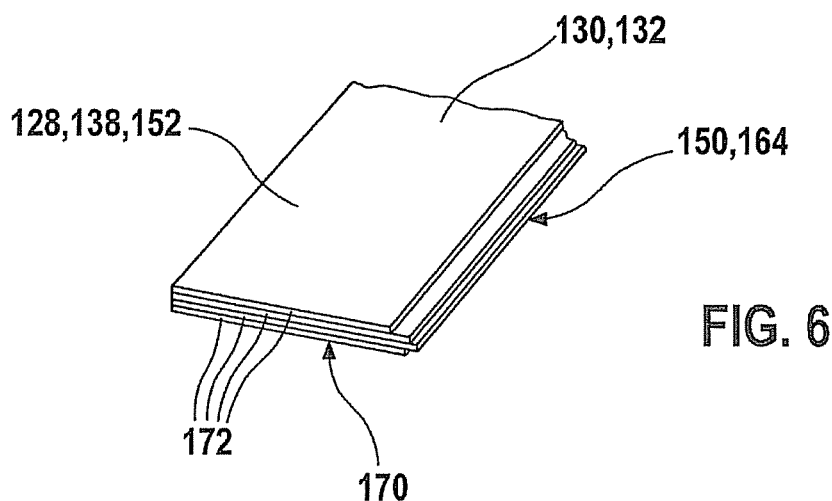
FIG. 6 shows an exemplary embodiment of a sensor carrier in multilayer technology.
Figure 7:
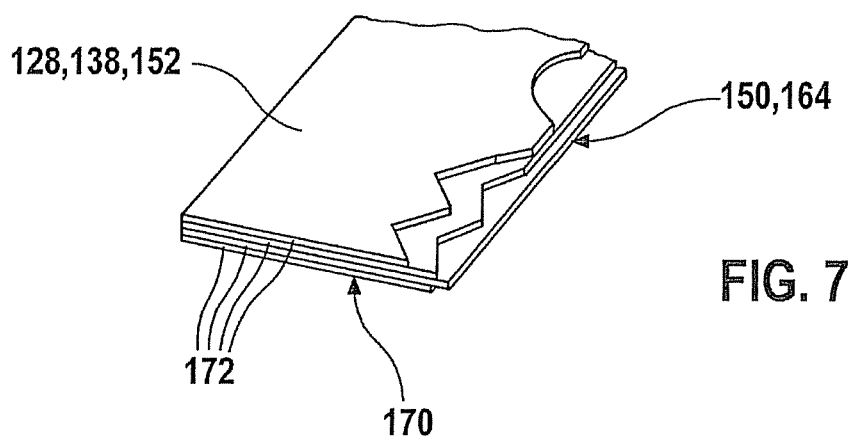
FIG. 7 shows a modification of the sensor carrier according to FIG. 6 having differently contoured carrier layers.

In FIGS. 6 and 7, this idea of a three-dimensional profiling is pursued further in additional exemplary embodiments. These exemplary embodiments are based on the recognition that, when circuit boards 138 are used as sensor carriers 128, for instance, again in the form of an extension 152 in FIG. 2 or FIG. 3, profiling and/or contouring of inflow edge 150 to produce turbulators 164 may be implemented especially easily by using a multilayer construction 170. This multilayer construction 170 includes a plurality of carrier layers 172, which may be produced, for instance, from usual circuit board materials. These carrier layers 172 may be adhered to one another, for example.

Using this multilayer construction 170 makes possible a three-dimensional profiling of inflow edge 150, which enables both planar processing and handling expediently.

Because of the step-wise contours in the area of inflow edge 150, turbulators 164 are able to be formed which, in turn, are able to produce longitudinal turbulences 166 (not shown in FIGS. 6 and 7) in a similarly efficient manner as turbulators 164 shown in FIGS. 3, 5A and 5B. This being the case, continuous profiling of inflow edge 150, such as, for instance, in FIG. 1B is not required. Inflow edge 150 of sensor carrier 128 is shown quantized in the individual planes of carrier layers 172. Such a quantization by the stepping of the profile of the inflow edge 150 could, however, be basically implemented also within the scope of the exemplary embodiments and/or exemplary methods of the present invention if, as circuit board 138, a solid body, and not a multilayer construction 170, is used. Thereby, too, the effect, according to the exemplary embodiments and/or exemplary methods of the present invention, of the development of turbulators 164 for the development of longitudinal turbulences 166 could be produced.

The multilayer construction 170 according to FIGS. 6 and 7, in addition to the advantages of the use of multiple utilization, furthermore offers the possibility of differently contouring the individual carrier layers 172 at inflow edge 150. This is illustrated in FIG. 7. Here it may be seen that not only one stepped development of individual carrier layers 172 is implemented, but that the individual carrier layers 172 are also differently contoured on their side facing inflow edge 150. In this way, turbulators may be deliberately developed having three-dimensional profiles.

What is claimed is:

1. A sensor system for determining at least one parameter of a fluid medium flowing through a channel, in particular of an intake air mass of an internal combustion engine, comprising:

at least one sensor chip situated in the channel for determining the parameter of the fluid medium, the sensor chip being accommodated in a sensor carrier that extends into the channel;

an inflow edge that is situated at an angle to the flow of the fluid medium;

wherein the sensor carrier is embodied at least partially as a multi-layer sensor carrier and having at least two carrier layers that are connected to one another and the inflow edge being executed at least partially in a step-wise manner by different dimensioning of the carrier layers;

wherein the inflow edge has at least one turbulator, which is equipped to develop turbulences in the flowing fluid medium in the area of the sensor carrier and the carrier layers are contoured at least partially differently along the inflow edge so as to form the turbulator.

2. The sensor system of claim 1, wherein the inflow edge has a longitudinal extension direction, the inflow edge having at least one of the following countours in the longitudinal extension direction: a wave profile; a zigzag profile; a triangular profile having a plurality of triangles lined up against one another in the longitudinal extension direction; a profile having at least one recess, which includes a plurality of round recesses lined up against one another in the longitudinal extension direction.

3. The sensor system of claim 1, wherein the turbulator is configured so that longitudinal turbulences develop in the flow of the fluid medium on a surface of the sensor carrier lying opposite to the sensor chip.

4. The sensor system of claim 1, wherein the sensor carrier is configured at least partially as a multilayer sensor carrier and has at least two carrier layers that are connected to each other.

5. The sensor system of claim 1, wherein the inflow edge is executed at least partially in stepped fashion by a different dimensioning of the carrier layers.

6. The sensor system of claim 1, wherein the carrier layers are at least partially differently contoured along the inflow edge, so as to form the turbulator.

7. The sensor system of claim 1, wherein the inflow edge is positioned in the channel so that it has the flowing medium flowing at it at a 90° angle.

8. The sensor system of claim 1, wherein the sensor chip is contacted electrically via at least one electrical connection, via a bonding, and wherein the electrical connection is separated from the fluid medium by at least one cover, which includes a glob top.

9. The sensor system of claim 1, wherein the sensor carrier is a part of a circuit board.

10. The sensor system of claim 9, wherein at least one control and evaluation circuit of the sensor system is situated fully or partially on the circuit board.

11. The sensor system of claim 9, wherein the sensor system has at least one housing, the channel being developed in the housing, wherein the housing has an electronics space that is separate from the channel, wherein the circuit board is accommodated essentially in the electronics space, and wherein the sensor carrier is developed as an extension of the circuit board extending into the channel.

12. The sensor system of claim 11, wherein the extension is configured at the inflow edge at least partially in stepped fashion in a sectional plane perpendicular to the circuit board.

* * * * *

UNITED STATES PATENT AND TRADEMARK OFFICE
CERTIFICATE OF CORRECTION

PATENT NO.       : 8,607,624 B2                                           Page 1 of 1
APPLICATION NO. : 13/119100
DATED            : December 17, 2013
INVENTOR(S)      : Renninger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 254 days.

Signed and Sealed this
Twenty-second Day of September, 2015

Michelle K. Lee
*Director of the United States Patent and Trademark Office*